United States Patent
Mauser et al.

(10) Patent No.: US 9,534,598 B2
(45) Date of Patent: Jan. 3, 2017

(54) SEALING DEVICE FOR A CAM RING OF A VARIABLE DISPLACEMENT PUMP

(71) Applicant: Magna Powertrain Bad Homburg GmbH, Bad Homburg (DE)

(72) Inventors: Thilo Mauser, Bad Vilbel (DE); Andreas Nuetzel, Weidenberg (DE)

(73) Assignee: MAGNA POWERTRAIN BAD HOMBURG GMBH, Bad Homburg (DE)

( * ) Notice: Subject to any disclaimer, the term of this patent is extended or adjusted under 35 U.S.C. 154(b) by 0 days.

(21) Appl. No.: 14/364,860

(22) PCT Filed: Nov. 29, 2012

(86) PCT No.: PCT/DE2012/100361
§ 371 (c)(1),
(2) Date: Jun. 12, 2014

(87) PCT Pub. No.: WO2013/087068
PCT Pub. Date: Jun. 20, 2013

(65) Prior Publication Data
US 2014/0341768 A1    Nov. 20, 2014

(30) Foreign Application Priority Data
Dec. 14, 2011   (DE) .................. 10 2011 056 405

(51) Int. Cl.
*F01C 19/00*   (2006.01)
*F04C 2/344*   (2006.01)
(Continued)

(52) U.S. Cl.
CPC ........ *F04C 15/0015* (2013.01); *F01C 19/005* (2013.01); *F04C 2/30* (2013.01);
(Continued)

(58) Field of Classification Search
USPC ........... 418/16, 138; 277/345, 500; 384/151; 60/605.2
See application file for complete search history.

(56) References Cited

U.S. PATENT DOCUMENTS 3,161,350 A    12/1964  Lorcher
3,191,503 A    6/1965   Fuehrer
(Continued)

FOREIGN PATENT DOCUMENTS

DE    1181984 B     11/1964
DE    2521049 A1    11/1976
(Continued)

OTHER PUBLICATIONS

International search report mailed Feb. 7, 2014 (PCT/DE2012/100361).
(Continued)

*Primary Examiner* — Kenneth Bomberg
*Assistant Examiner* — Paul Thiede
(74) *Attorney, Agent, or Firm* — Dickinson Wright PLLC (57) ABSTRACT

A sealing device includes a relatively dimensionally stable, elongated friction and/or wear element and an elastically-deformable elongated sealing element which rests lengthwise on the friction and/or wear element. The friction and/or wear element encompasses the sealing element at the ends of the friction and/or wear element.

16 Claims, 4 Drawing Sheets

(51) Int. Cl.
 *F04C 15/00* (2006.01)
 *F16J 15/32* (2016.01)
 *F04C 14/22* (2006.01)
 *F04C 2/30* (2006.01)

(52) U.S. Cl.
 CPC .......... *F04C 14/22* (2013.01); *F04C 15/0034* (2013.01); *F16J 15/32* (2013.01); *F04C 2/344* (2013.01)

(56) References Cited

U.S. PATENT DOCUMENTS

| | | |
|---|---|---|
| 3,213,837 A | 10/1965 | Keylwert |
| 3,659,503 A | 5/1972 | Ehluss et al. |
| 3,873,249 A | 3/1975 | Rao |
| 3,990,819 A | 11/1976 | Ritchie |
| 2004/0035574 A1* | 2/2004 | Pippert .................. E21B 21/02 166/90.1 |
| 2007/0189913 A1 | 8/2007 | Atkins |
| 2011/0194967 A1* | 8/2011 | Watanabe ............. F04C 14/226 418/138 |

FOREIGN PATENT DOCUMENTS

| | | |
|---|---|---|
| EP | 0345392 A1 | 12/1989 |
| JP | S6213701 A | 1/1987 |
| SU | 1753048 A1 | 8/1992 |

OTHER PUBLICATIONS

Search Report dated May 18, 2016 from corresponding Chinese Patent Application No. 2012800619843.

\* cited by examiner

SEALING DEVICE FOR A CAM RING OF A VARIABLE DISPLACEMENT PUMP

CROSS REFERENCE TO RELATED APPLICATION

This application claims the benefit of PCT International Application Serial No. PCT/DE2012/100361 filed on Nov. 29, 2012 and entitled a "Sealing Device", which claims the benefit of DE 102011056405.5 filed on Dec. 14, 2011, the entire disclosures of which are hereby incorporated by reference.

BACKGROUND

Field of the Invention

The invention relates to a sealing device having a relatively dimensionally stable, elongate friction and/or wear element and having an elastically deformable elongate sealing element, which rests lengthwise on the friction and/or wear element. The invention furthermore relates to a friction and/or wear element for a sealing device of this kind. The invention furthermore relates to a cam ring having a groove in which a sealing device of this kind is arranged. In addition, the invention relates to a variable displacement pump having a cam ring which can be moved in order to adjust the stroke of the variable displacement pump and which has a groove, and having a support ring.

The sealing element is embodied as an O-ring bead, for example, and, in addition to its sealing function, has the task of keeping the elongate friction and/or wear element in sealing contact with a mating surface. The friction and/or wear element is formed from a fluoroelastomer, for example. The sealing device is preferably used to seal a sealing gap between an adjustable cam ring and a support ring of a variable displacement pump of the kind known from European Patent Application EP 1 801 419 A2, for example.

SUMMARY

It is an object of the invention to provide a sealing device having a relatively dimensionally stable, elongate friction and/or wear element and having an elastically deformable elongate sealing element, which rests lengthwise on the friction and/or wear element, by means of which sealing device leakage occurring in the installed state of the sealing device can be minimized and/or which sealing device is simple to assemble.

In the case of a sealing device having a relatively dimensionally stable, elongate friction and/or wear element and having an elastically deformable elongate sealing element, which extends along and about a central axis between two seal ends and rests lengthwise on the friction and/or wear element, the object is achieved by virtue of the fact that the friction and/or wear element defines two mutually facing inner contact surfaces that engage and encompass the sealing element at the ends of the sealing element to retain the sealing element together with the friction and/or wear element. This is a simple means of ensuring that, in the installed state of the sealing device, the sealing element has no contact at the ends thereof with mating surfaces, relative to which the sealing device moves during operation. Moreover, the embodiment according to the invention of the friction and/or wear element allows more precise guidance of the friction and/or wear element in the installed state of the sealing device. In the installed state, the sealing device is preferably arranged in a longitudinal groove in such a way that the friction and/or wear element projects somewhat from the longitudinal groove transversely to the longitudinal extent of the sealing device.

A preferred illustrative embodiment of the sealing device is characterized in that the friction and/or wear element is of substantially U-shaped design, having a base from which two legs are angled. Here, the base of the U-shaped form of the friction and/or wear element is significantly longer than the legs angled therefrom.

Another preferred illustrative embodiment of the sealing device is characterized in that the friction and/or wear element has an elongate main body with two angled ends. By means of the two angled ends, the friction and/or wear element encompasses the sealing element at the ends thereof. However, the ends of the sealing element are not completely encompassed by the angled ends of the friction and/or wear element in this arrangement.

Another preferred illustrative embodiment of the sealing device is characterized in that the elongate main body has a rectangular cross section. The cross section of the elongate main body is preferably matched to the groove width of a longitudinal groove in which the sealing device is arranged in the installed state. The distance between two groove flanks of the longitudinal groove is referred to as the groove width or groove breadth.

Another preferred illustrative embodiment of the sealing device is characterized in that the angled ends each have a rectangular cross section. The rectangular cross section of the angled ends is preferably matched to the groove width of a longitudinal groove in which the sealing device is arranged in the installed state. The distance between two groove flanks of the longitudinal groove is referred to as the groove width or groove breadth.

Another preferred illustrative embodiment of the sealing device is characterized in that the ends of the friction and/or wear element are each angled at a right angle to the elongate main body. If required, the angled ends of the friction and/or wear element can also be slightly beveled, thereby simplifying positioning where relevant.

Another preferred illustrative embodiment of the sealing device is characterized in that the sealing element is connected in a captive manner to the friction and/or wear element. The handling and installation of the sealing device are thereby considerably simplified.

Another preferred illustrative embodiment of the sealing device is characterized in that the sealing element rests by means of the ends thereof on the angled ends of the friction and/or wear element. The ends of the sealing element preferably rest flat against the angled ends of the friction and/or wear element.

Another preferred illustrative embodiment of the sealing device is characterized in that the sealing element is preloaded against the friction and/or wear element in the longitudinal direction. By means of the preload, the sealing element can be held captive on the friction and/or wear element in a simple manner.

Another preferred illustrative embodiment of the sealing device is characterized in that the sealing element is integrally formed with and/or bonded to the friction and/or wear element at the ends of said sealing element. The sealing element can be secured on the friction and/or wear element by vulcanization, for example. It is particularly advantageous if the sealing device is embodied as a multicomponent injection molding with the sealing element and the friction and/or wear element.

Another preferred illustrative embodiment of the sealing device is characterized in that the friction and/or wear element is embodied as a sealing strip. The sealing strip is preferably formed from a fluoroelastomer.

Another preferred illustrative embodiment of the sealing device is characterized in that the sealing element is embodied as an O-ring bead. The sealing element is preferably produced from the same material as or a similar material to conventional O-rings.

The invention furthermore relates to a friction and/or wear element for a sealing device described above.

The invention furthermore relates to a cam ring having a groove in which a sealing device described above is arranged. The groove is preferably embodied as a longitudinal groove having a rectangular cross section.

In the case of a variable displacement pump having a cam ring which can be moved in order to adjust the stroke of the variable displacement pump and which has a groove, and having a support ring, the object indicated above is alternatively or additionally achieved by virtue of the fact that a sealing device as described above is arranged in the groove in such a way that the friction and/or wear element is held in contact with the support ring by a preload of the elastically deformable sealing element. The friction and/or wear element ensures high abrasion resistance of the sealing device. The elastically deformable sealing element enables the sealing effect of the sealing device to be maintained even when the cam ring moves relative to the support ring during the adjustment of the variable displacement pump. As a particularly advantageous option, sealing gaps between the cam ring and the support ring can be sealed off in a variable manner by means of the sealing device according to the invention.

BRIEF DESCRIPTION OF THE DRAWINGS

Further advantages, features and details of the invention will become apparent from the following description, in which various illustrative embodiments are described in detail with reference to the drawing, in which.

DETAILED DESCRIPTION

Figure 1:
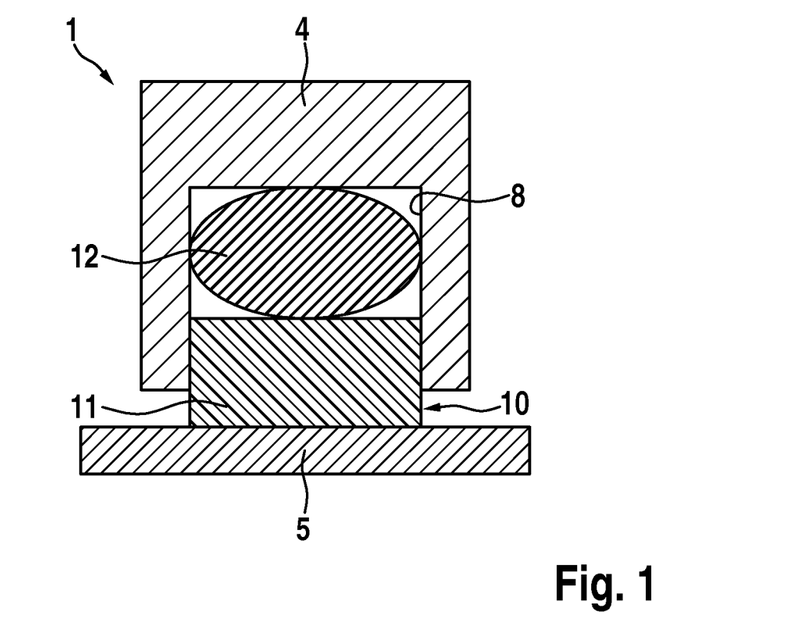
FIG. 1 shows two housing parts with a sealing device in cross section.

FIG. 1 shows a technical device 1 having a first housing part 4 and a second housing part 5 in cross section in greatly simplified form. The second housing part 5 has the shape of a flat plate, which is spaced apart slightly from the first housing part 4. The first housing part 4 surrounds a longitudinal groove 8, in which a sealing device 10 is partially accommodated.

Figure 2:
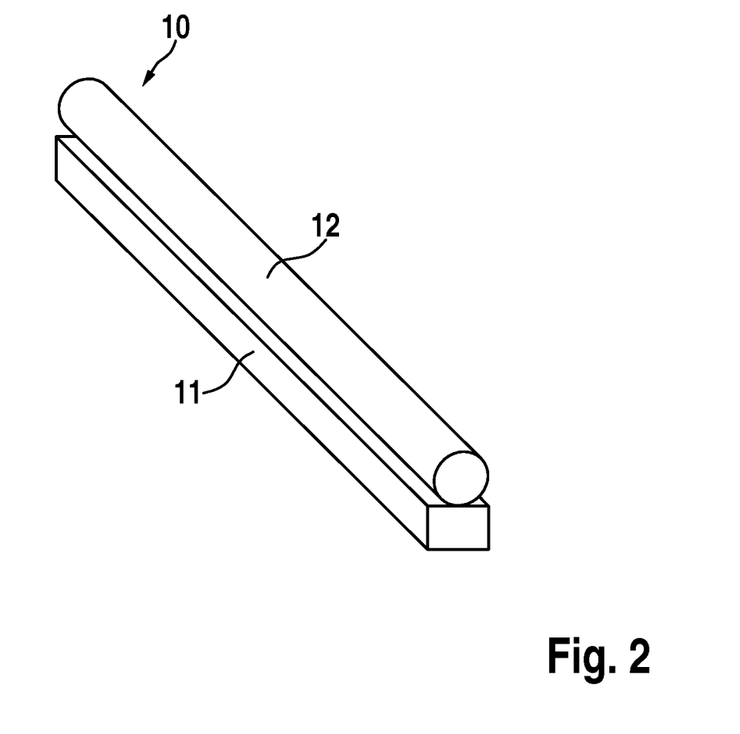
FIG. 2 shows a perspective view of the sealing device from FIG. 1.

The sealing device 10 illustrated in perspective in FIG. 2 comprises a friction and/or wear element 11 and a sealing element 12. The friction and/or wear element 11 is composed of a relatively dimensionally stable material, in particular a fluoroelastomer. The friction and/or wear element 11 has a rectangular cross section. The friction and/or wear element 11 is configured to act as a friction element, a wear element, or an element providing both a friction and wear feature. The sealing element 12 is embodied as an O-ring bead with a circular cross section and is elastically deformable.

In the installed state of the sealing device 10 in FIG. 1, it can be seen that the sealing element 12 has been elastically deformed, resulting in a preloading force, by means of which the friction and/or wear element 11 is held in close contact with the second housing part 5.

Figure 3:
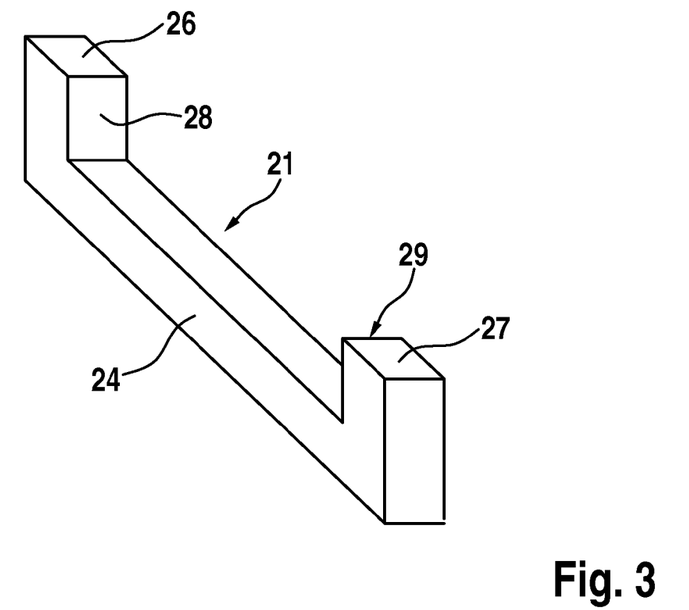
FIG. 3 shows a perspective view of a friction and/or wear element according to the invention.

FIG. 3 shows a friction and/or wear element 21 according to the invention in perspective. The friction and/or wear element 21 is configured to act as a friction element, a wear element, or an element providing both a friction and wear feature. The friction and/or wear element 21 has an elongate main body 24 with a rectangular cross section. The elongate main body 24 has two angled ends 26, 27, which are each angled at a right angle to the elongate main body 24.

The angled ends 26, 27 likewise have a rectangular cross section. The two mutually facing inner surfaces 28, 29 of the angled ends 26, 27 of the elongate main body 24 form contact surfaces for a sealing element.

Figure 4:
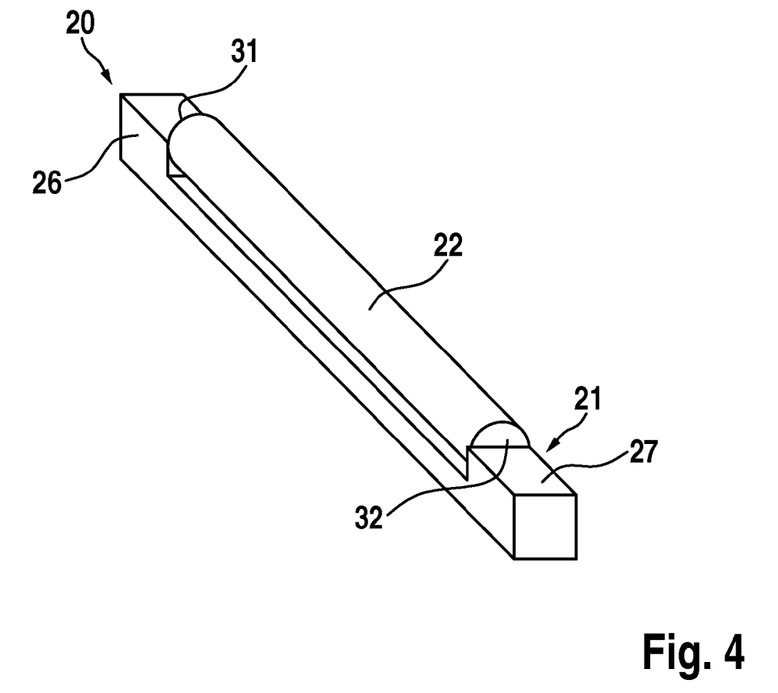
FIG. 4 shows a perspective view of a sealing device having the friction and/or wear element from FIG. 3.

In FIG. 4, the friction and/or wear element 21 is illustrated with a sealing element 22. Together with the friction and/or wear element 21, the sealing element 22 forms a sealing device 20 according to the invention. The sealing element 22 is embodied as an O-ring bead with a circular cross section. The seal ends 31, 32 of the sealing element 22 rest partially on the inner surfaces 28, 29 of the angled ends 26, 27 of the friction and/or wear element 21. The sealing device 20 can also be inserted into the longitudinal groove 8 of the device 1 from FIG. 1.

Figure 5:
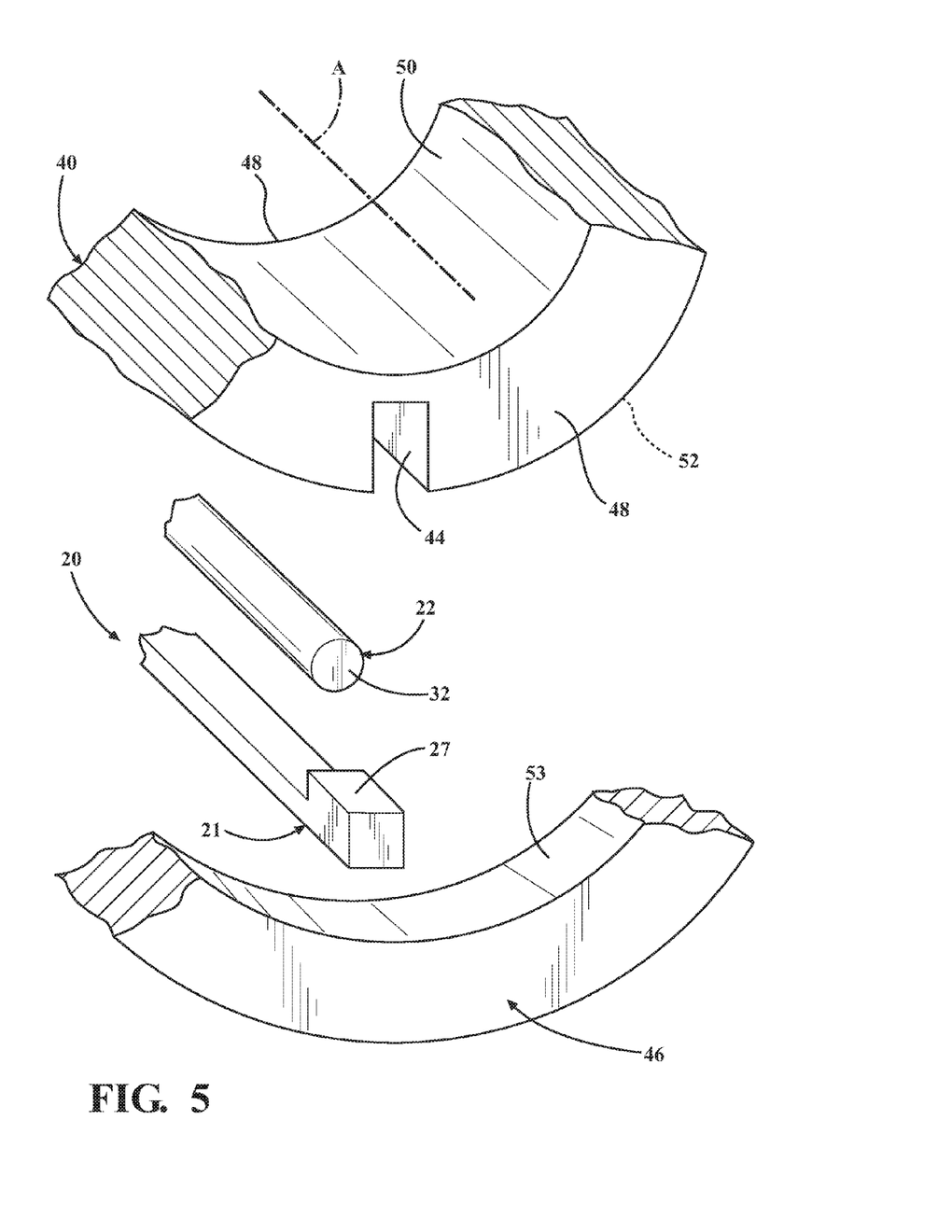
FIG. 5 shows an exploded detail view of a cam ring of a variable displacement pump having the sealing device from FIG. 4.

FIG. 5 shows a detail view of the cam ring 40 and a support ring 46 of a variable displacement pump in perspective. On the outside, the cam ring 40 is provided with a longitudinal groove 44, which serves to accommodate the sealing device 20. In this arrangement, the sealing device 20 is inserted into the longitudinal groove 44 in such a way that the angled ends 26, 27 of the friction and/or wear element 21 illustrated fully in FIGS. 3 and 4 partially encompass the seal ends 32, 31 of the sealing element 22. As shown in FIG. 5, the cam ring 40 surrounds a center axis A and extends axially between opposite side surfaces 48. The cam ring 40 also includes an inner surface 50 facing the center axis A and an outer surface 52 facing an inner surface 53 of the support ring 46. The outer surface 52 of the cam ring 40 defines the longitudinal groove 44, or a plurality of the grooves 44, each extending longitudinally between the opposite side surfaces 48 and parallel to the center axis A. Each groove 44 contains the sealing element 22. The sealing element 22 extends longitudinally between the opposite side surfaces 48 of the cam ring 40 and the friction element 21 is disposed between the sealing element 22 and the support ring 46. The friction element 21 is configured to extend across the entire length of the longitudinal groove 44 such that its opposite end surfaces are aligned with the opposite side surfaces 48 of the cam ring 40.

Figure 6:
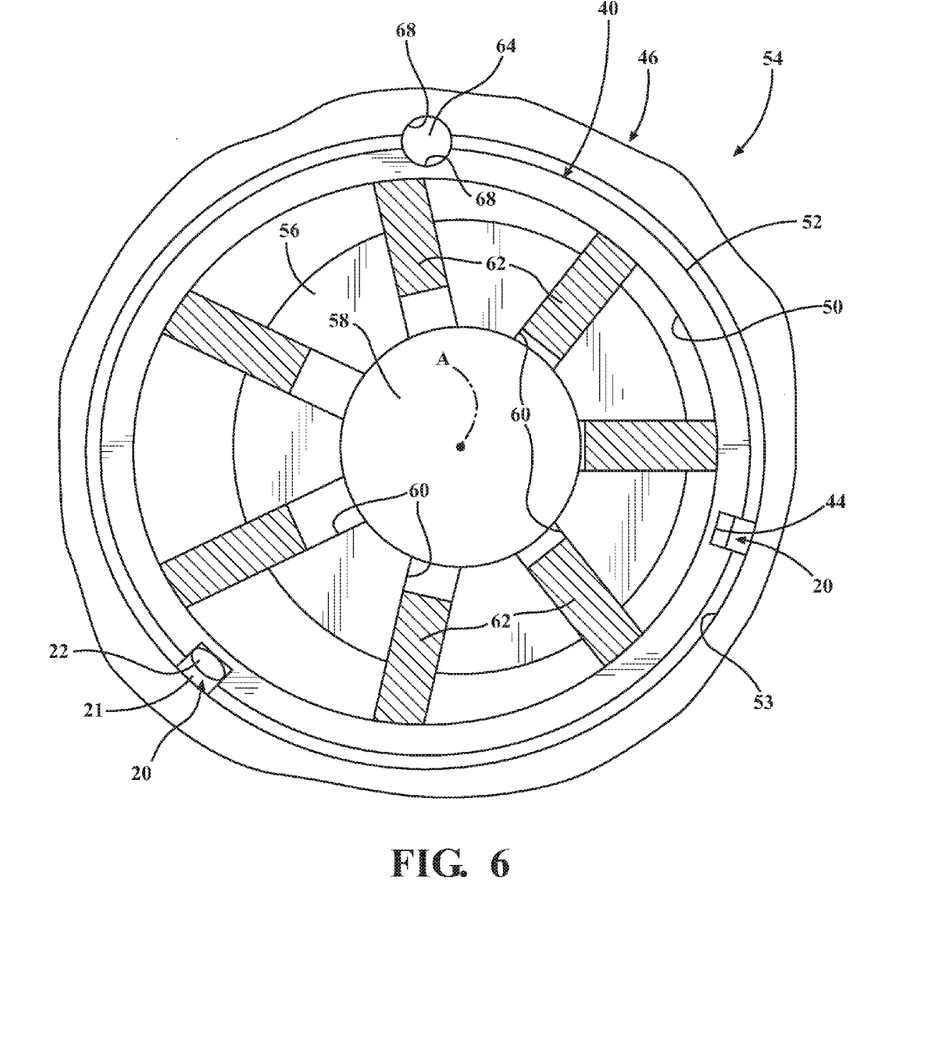
FIG. 6 shows a variable displacement pump comprising a cam ring and a support ring according to an example embodiment

FIG. 6 shows the variable displacement pump 54 comprising the cam ring 40 and the support ring 46 according to an example embodiment. The support ring 46 surrounds a center axis A and the cam ring 40 is arranged adjustably within the support ring 46, which is also referred to as a spacer ring. In turn, a rotor 56 is driven within the cam ring 40, e.g. by a drive shaft 58.

In the example embodiment of FIG. 6, the variable displacement pump 54 is a hydraulic pump, which is embodied as a vane pump. Radially extending slots 60, in which vanes 62 are guided in a radial direction, are provided in the rotor 56. The vanes 62 rest by means of the radially outer ends thereof on a cam contour, which is provided on the inside surface 50 of the cam ring 40.

When the rotor 56 rotates, there is an increase in volume in the region of a suction space between the rotor 56 and the cam ring 40, causing a hydraulic medium to be drawn in via an intake opening. At the same time, there is a decrease in volume in a pressure region between the rotor 56 and the cam ring 40, causing the hydraulic medium to be pumped into a kidney-shaped pressure port.

The delivery rate of the variable displacement pump 54 can be varied by adjusting the cam ring 40 relative to the rotor 56 within the support ring 46 or spacer ring. During adjustment, the cam ring 40 performs a pivoting motion around a pivot pin 64, which is arranged in corresponding depressions 68 between the outer surface 52 of the cam ring 40 and the inner surface 53 of the support ring 46.

The cam ring 40 is preloaded by a spring, which is arranged in a recess. A total of three variable pressure spaces are formed between the cam ring 40 and the spacer ring 46, these spaces being sealed off from one another by sealing devices 20 and the pivot pin 64. In the case of the sealing devices 20, it is the same sealing device 20 as that illustrated in FIGS. 3 to 5.

The sealing devices 20 are each arranged in the longitudinal groove 44, which is provided in the cam ring 40. The friction and/or wear elements 21 of the sealing devices 20 are relatively dimensionally stable and are each held in close contact with the support ring 46 by the elastically deformable sealing element 22.

LIST OF REFERENCE SIGNS 1 device
4 first housing part
5 second housing part
8 longitudinal groove
10 sealing device
11 friction and/or wear element
12 sealing element
20 sealing device
21 friction and/or wear element
22 sealing element
24 elongate main body
26 end
27 end
28 inner surface
29 inner surface
31 seal end
32 seal end
40 cam ring
44 longitudinal groove
46 support ring
48 side surface (of the cam ring)
50 inner surface (of the cam ring)
52 outer surface (of the cam ring)
53 inner surface (of the support ring)
54 variable displacement pump
56 rotor
58 drive shaft
62 vanes
68 depression

What is claimed is:

1. A variable displacement pump, comprising:
a support ring surrounding a center axis and having an inner surface;
a cam ring disposed within said support ring and surrounding said center axis, said cam ring including an inner surface facing said center axis and an outer surface facing said inner surface of said support ring with said inner surface and said outer surface extending axially between opposite side surfaces, said outer surface of said cam ring defining at least one groove extending longitudinally between said opposite side edges and parallel to said center axis; and
at least one sealing device being disposed in at least one groove of said cam ring, said cam ring including side surfaces and a base surface defining said at least one groove and said at least one sealing device including a sealing element and a friction element each having opposite ends and each extending parallel to said center axis,
wherein said sealing element extends longitudinally within the at least one groove between said opposite side surfaces of said cam ring and is elastically deformable,
wherein said friction element is disposed radially between said sealing element and said inner surface of said support ring and is in engaging contact with said inner surface of said support ring, and
wherein said opposite ends of said friction element respectively extend from said base portion of said friction element radially inward toward said base surface of said cam ring, said radially disposed inward opposite ends defining inner contact surfaces and said sealing element being disposed therebetween such that said respective opposing ends of the sealing element engagingly contact said respective inner contact surfaces of said friction element so that said sealing element spans a width of said at least one groove in which portions of said sealing element engagingly contact said friction element and each of said side surfaces and said base surface that define said at least one groove of said cam ring, the respective portions of the sealing element having said engaged contact with said friction element and each of said side surfaces and said base surface along the entire length of said sealing element.

2. The variable displacement pump of claim 1, wherein said cam ring is preloaded for holding said friction element in said engaging contact with said inner surface of said support ring.

3. The variable displacement pump of claim 1 further including a rotor disposed within said cam ring and a drive shaft for driving said rotor.

4. The variable displacement pump of claim 3, wherein said rotor includes a plurality of slots extending radially between said center axis and said inner surface of said cam ring, and further including a plurality of vanes each disposed in one of said radially extending slots and engaging said inner surface of said cam ring.

5. The variable displacement pump of claim 1, including a pivot pin disposed in corresponding depressions formed in said outer surface of said cam ring and said inner surface of said support ring, wherein said cam ring pivots about said pivot pin relative to said support ring.

6. The variable displacement pump of claim 5, wherein at least one groove comprises a plurality of grooves formed in said outer surface of said cam ring each groove in the plurality of grooves containing the at least one sealing device;

said cam ring and said support ring define a first pressure space located between said pivot pin and the at least one sealing device disposed in one of the grooves of the plurality of grooves which is a first sealing device, a second pressure space located between said first sealing device and the at least one sealing device disposed in the other groove of the plurality of grooves which is a second sealing device, and a third pressure space located between said second sealing device and said pivot pin.

7. The variable displacement pump of claim 1, wherein said friction element is formed of a fluoroelastomer.

8. The variable displacement pump of claim 1, wherein said friction element extends longitudinally along the length of said at least one groove formed in said cam ring, and wherein at least one of said opposite ends of said friction element covers at least a portion of one of the opposing ends of said sealing element.

9. The variable displacement pump of claim 8, wherein both of said opposite ends of said friction element, respectively, cover at least a portion of said respective opposite ends of said sealing element.

10. The variable displacement pump of claim 1, wherein said cam ring is preloaded for holding said friction element in said engaging contact with said inner surface of said support ring;

at least one groove comprises a plurality of grooves formed in said outer surface of said cam ring with each groove in the plurality of grooves containing the at least one sealing device;

each friction element of each at least one sealing device is formed of a fluoroelastomer;

each friction element of each at least one sealing device extends longitudinally between said opposite ends and along the length of said cam ring, said inner contact surfaces of each friction element of each at least one sealing device cover at least a portion of said opposite ends of each respective sealing element associated with the respective plurality of grooves to retain said sealing element together with said friction element in each groove of the plurality of grooves; and wherein said variable displacement pump further includes:
a rotor disposed within said cam ring and a drive shaft for driving said rotor;
said rotor including a plurality of slots each extending radially between said center axis and said cam ring;
a plurality of vanes each guided in one of said radially extending slots and engaging said inner surface of said cam ring;
a pivot pin disposed in corresponding depressions formed in said outer surface of said cam ring and inner surface of said support ring, wherein said cam ring pivots about said pivot pin relative to said support ring; and
said cam ring and said support ring define a first pressure space located between said pivot pin and the at least one sealing device disposed in one of the grooves of the plurality of grooves which is a first sealing device, a second pressure space located between said first sealing device and the at least one sealing device disposed in the other groove of the plurality of grooves which is a second sealing device, and a third pressure space located between said second sealing device and said pivot pin.

11. A sealing apparatus for a variable displacement pump, comprising:

a support ring of the variable displacement pump surrounding a center axis;

a cam ring of the variable displacement pump disposed within said support ring, said cam ring surrounding said center axis and extending axially between opposite side surfaces, said cam ring including an inner surface facing said center axis and an outer surface facing an inner surface of said support ring, said outer surface of said cam ring defining at least one groove extending longitudinally between said opposite side surfaces and parallel to said center axis said cam ring including side surfaces and a base surface that define said at least one groove; and at least one sealing device being disposed in at least one groove formed in said cam ring, said at least one sealing device including a sealing element and a friction element each extending parallel to said center axis between opposite ends, said sealing element extending longitudinally between said opposite side surfaces of said cam ring and being elastically deformable, said friction element disposed radially between said sealing element and said inner surface of said support ring, and said friction element being in engaging contact with said support ring, and said opposite ends of said friction element extending radially inwardly toward said groove and defining inner contact surfaces facing one another and retaining said opposite ends of said sealing element together with said friction element, said sealing element spanning a width of said at least one groove in which portions of said sealing element engagingly contact said friction element and each of said side surfaces and said base surface that define said at least one groove of said cam ring, the respective portions of the sealing element having said engaged contact with said friction element and each of said side surfaces and said base surface along the entire length of said sealing element.

12. The sealing apparatus of claim 11, wherein said friction element extends longitudinally between said opposite ends and longitudinally between said opposite side surfaces of said cam ring, and wherein at least one of said radially inward extending opposite ends of the friction element engages at least a portion of one of the opposing ends of said sealing element.

13. The sealing apparatus of claim 12, wherein said cam ring is preloaded and holds said friction element in said engaging contact with said inner surface of said support ring.

14. The cam ring of claim 11, wherein said friction element is formed of a fluoroelastomer.

15. A sealed cam ring for a variable displacement pump, comprising:

said sealed cam ring surrounding a center axis and adapted to be disposed within a support ring of the variable displacement pump, said sealed cam ring extending axially between opposite side surfaces and including an inner surface and an outer surface, the outer surface facing an inner surface of the support ring, a groove being formed in said sealed cam ring extending longitudinally between said opposite side surfaces with a base surface and side surfaces extending upwardly from said base surface of the sealed cam ring defining said groove;

a sealing element spanning a width of said groove in which portions of said sealing element engagingly contact each of said base surface and said side surfaces of said sealed cam ring along the entire length of said sealing element, said sealing element extending longitudinally parallel to the center axis between opposite ends and longitudinally between said opposite side surfaces of said sealed cam ring and being elastically deformable; and a friction element including a base portion, said base portion disposed on said sealing element so as to engagingly make contact with said sealing element along the length of the sealing element, said friction element extending parallel to the center axis between opposite ends and longitudinally along the length of said groove, wherein said opposite ends of said friction element extend radially inwardly toward said base surface of said groove and define inner contact surfaces that retain said opposite ends of said sealing element together with said friction element, and said respective inner contact surfaces of the friction element cover at least a portion of said respective opposite ends of said sealing element.

16. The sealed cam ring of claim 15, wherein said respective inner contact surfaces of said radially inward opposite ends of said friction element engage said respective opposite ends of said sealing element and retain said sealing element together with said friction element.

* * * * *